United States Patent
Smith et al.

(10) Patent No.: US 6,751,065 B2
(45) Date of Patent: Jun. 15, 2004

(54) FLUTTER-FREE LAMINAR FLOW SUSPENSION FOR A DISK DRIVE

(75) Inventors: Gordon James Smith, Rochester, MN (US); Sri M. Sri-Jayantha, Ossining, NY (US)

(73) Assignee: Hitachi Global Storage Technologies Netherlands, B.V. (NL)

( * ) Notice: Subject to any disclaimer, the term of this patent is extended or adjusted under 35 U.S.C. 154(b) by 81 days.

(21) Appl. No.: 10/134,949

(22) Filed: Apr. 29, 2002

(65) Prior Publication Data

US 2003/0202287 A1 Oct. 30, 2003

(51) Int. Cl.[7] .................................................. G11B 5/48
(52) U.S. Cl. ...................................................... 360/244.9
(58) Field of Search ............................. 360/244.9, 244.4, 360/244.2, 245.8

(56) References Cited

U.S. PATENT DOCUMENTS 4,723,186 A * 2/1988 Nakajima et al. ......... 360/244.9
6,633,456 B1 * 10/2003 Tsuchida et al. .......... 360/244.8

FOREIGN PATENT DOCUMENTS

JP 62076078 A * 4/1987 ............ G11B/21/21
JP 05174507 A * 7/1993 ............ G11B/21/21

* cited by examiner

Primary Examiner—Craig A. Renner
(74) Attorney, Agent, or Firm—Robert B. Martin; Bracewell & Patterson LLP

(57) ABSTRACT

A head suspension assembly for a disk drive includes an actuator arm, a suspension having one end connected to the actuator arm, and flexure at the other end of the suspension for supporting a slider having a magnetic head to access and record data on a rotating magnetic disk. The suspension is manufactured from a flat sheet of resilient spring material, such a stainless steel. The side edges of the suspension are formed into longitudinal stiffeners that have aerodynamic cross-sections, so that the transverse airflow across the top and bottom of the suspension, generated by the rotating magnetic disk, is laminar and substantially free of turbulence.

12 Claims, 4 Drawing Sheets

FLUTTER-FREE LAMINAR FLOW SUSPENSION FOR A DISK DRIVE

BACKGROUND OF THE INVENTION

1. Field of the Invention

The present invention relates to an improved suspension for a head suspension assembly to be used in dynamic storage devices or rigid disk drives. More specifically, this invention is directed to certain improvements in the suspension achieved by applying aerodynamic shaping to its side edges to minimize radial motion of the read/write transducer due to flutter-induced dynamics of the suspension assembly that result from air turbulence.

2. Background Information

Suspension assemblies for supporting a slider over a rotating disk in a magnetic data storage device are in widespread use and are well known. Such suspension assemblies typically include a suspension supported at one end by an actuator arm and having a flexure or gimbal at its other end. A slider having a read/write transducer is mounted to the flexure. In operation, the rotating disk creates an air bearing on which the slider floats. The air bearing is defined by etching features on the slider surface closest to the disk. The suspension provides a spring force, typically about three grams, to counteract the force generated by the air bearing, and to position the slider at the proper "fly height" from the disk surface. The flexure is sufficiently compliant to allow the slider to pitch and roll in response to fluctuations in the air bearing created by variations in the surface of the rotating disk. In this manner, the slider is supported and can be positioned over the disk by an actuator assembly in the drive to access or create information on the disk.

The suspension is a cantilever beam that acts as a stiff spring to counteract the force of the air bearing. It is typically fabricated from a flat sheet of resilient metal stock, preferably stainless steel, to minimize size and mass. When designing a suspension, finite element modeling tools are used. The finite element model considers the suspension as a collection of interconnected mechanical elements with known properties. Modern finite element models provide stiffness, damping, resonant frequency and modes of vibration and allow a designer to accurately shape a suspension to achieve the requirements suitable for a given slider design. These requirements include the z-stiffness (i.e., stiffness in the direction perpendicular to the disk surface), resonant frequencies, modes of vibration and allowable dimensions in what to fit between the disks in a disk stack.

The suspensions in suspension assemblies are often provided with stiffening structures or other means for controlling certain required mechanical properties, such as z-stiffness and the resonance frequencies of the suspension. Typically, stiffening rails or flanges are provided at the longitudinal edges of the suspension, such as by bending the edges out of the plane of the suspension. Such edge stiffening rails provide rigidity to the length of the suspension between a substantially resilient spring region of the suspension that is adjacent to the end at which it is attached to the actuator arm of the disk drive, and the other end of the suspension which supports the slider in a read/write position relative to the associated disk. Greater height of the edge rails generally results in increased rigidity. The height of such edge stiffening rails also affects the resonance frequencies of the suspension. It is important to design the geometries and features of such suspensions so that they either possess resonance frequencies that are sufficiently high so as to be out of the range of vibration frequencies that may be experienced in particular disk drives or the like or to minimize the gain caused by any such resonance frequency.

Another manner of increasing rigidity is to simply form the suspensions from thicker materials. However, increased thicknesses also undesirably result in increased spring constants. Increased thicknesses also increase the mass of the suspension, which generally has a negative effect on resonance frequencies and slows the response time for disk access. Rails are advantageous in that the mechanical properties of load beams can be controlled without negative effects on the spring constant and with less mass.

However, a serious disadvantage of side rails, with their flat sides, is that they create turbulence in the airflow over the suspension in the vicinity of the disk spinning at high rpm. Such turbulence is detrimental to the performance of a disk drive because it causes unsteady forces that act on the suspension, causing it to "flutter." This fluttering increases the incidence of non-repeatable track misregistration, thereby causing read/write errors and hence performance degradation in the disk drives.

The flow of a viscous fluid, such as air, may be classified as laminar or turbulent on the basis of the internal flow structure. In laminar flow, the flow structure is characterized as by smooth motion in laminae or layers. Each layer glides smoothly over the adjacent layer, and there is no macroscopic mixing of adjacent fluid layers. Turbulent flow, on the other hand, is characterized by random three-dimensional flow of fluid particles, causing an exchange of momentum from one portion of the fluid to another. If one were to measure the velocity at a point along the direction of flow in a pipe for both laminar and turbulent flow with the same average flow rate, velocity in the laminar flow case would remain constant with time. By contrast, the instantaneous velocity for the turbulent flow would exhibit random fluctuations about the average flow velocity. For a body immersed in the turbulent flow, these random fluctuations in flow can excite different modes of vibration. In the case of a head suspension for a disk drive, the unsteady forces caused by turbulent airflow causes flutter that produces random track misregistration.

SUMMARY OF THE INVENTION

It is, therefore, a principle object of this invention to provide a flutter-free laminar flow suspension for a disk drive.

It is another object of the invention to provide a flutter-free laminar flow suspension for a disk drive that solves the above-mentioned problems.

These and other objects of the present invention are accomplished by the flutter-free laminar flow suspension for a disk drive disclosed herein.

In an exemplary aspect of the invention, a head suspension assembly for a disk drive is comprised of an actuator arm, a suspension connected at its first end to the actuator arm, and a flexure disposed at the second end of the suspension for supporting a slider with a magnetic head. The suspension has a rigid region between the first and second ends, the rigid region having top and bottom surfaces and side edges. In the rigid region, the side edges are formed into longitudinal stiffeners having aerodynamic cross-sections. The aerodynamic cross-sections cause transverse airflow across the top and bottom surfaces of the rigid region to be laminar and substantially free of turbulence.

In another aspect of the invention, the suspension is manufactured from a generally flat sheet of resilient spring material, preferably stainless steel, by shaping a suspension blank having first and second ends, and a rigid region between the first and second ends, the rigid region having top and bottom surfaces and side edges. The side edges of the rigid region are formed into longitudinal stiffeners having aerodynamic cross-sections. The first end of the suspension blank is configured to connect to an actuator arm, and the second end is configured to accommodate a flexure for supporting a slider with a magnetic head.

In another aspect of the invention, stiffeners with aerodynamic cross-sections are formed at the side edges of the suspension by bending the side edges of the metal suspension blank at an angle, as in a conventional suspension, and then forming an aerodynamic fairing of a moldable material over the bent side edges.

In yet another aspect of the invention, the head suspension assembly including the inventive suspension comprises part of a data storage device that also includes a rotating rigid magnetic storage disk, and an actuator assembly connected to the actuator arm of the head suspension assembly for positioning the slider over the rotating disk. The aerodynamic cross-sections of the stiffeners at the edges of the suspension cause the transverse airflow across the top of and bottom surfaces of the suspension, which is generated by the rotating disk in proximity to the suspension, to be laminar and substantially free of turbulence.

By causing airflow across the suspension of a head suspension assembly to be laminar and substantially free of turbulence, the invention advantageously reduces the occurrence of unsteady forces on the suspension that excite flutter and cause read/write errors due to track misregistration.

DETAILED DESCRIPTION OF THE PREFERRED EMBODIMENTS

The invention will now be described in more detail by way of example with reference to the embodiment shown in the accompanying figures. It should be kept in mind that the following described embodiment is only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

The present invention is directed toward an improved suspension for a head suspension assembly, that has aerodynamic shaping applied its side edges to minimize flutter dynamics of the suspension that result from air turbulence.

Figure 1:
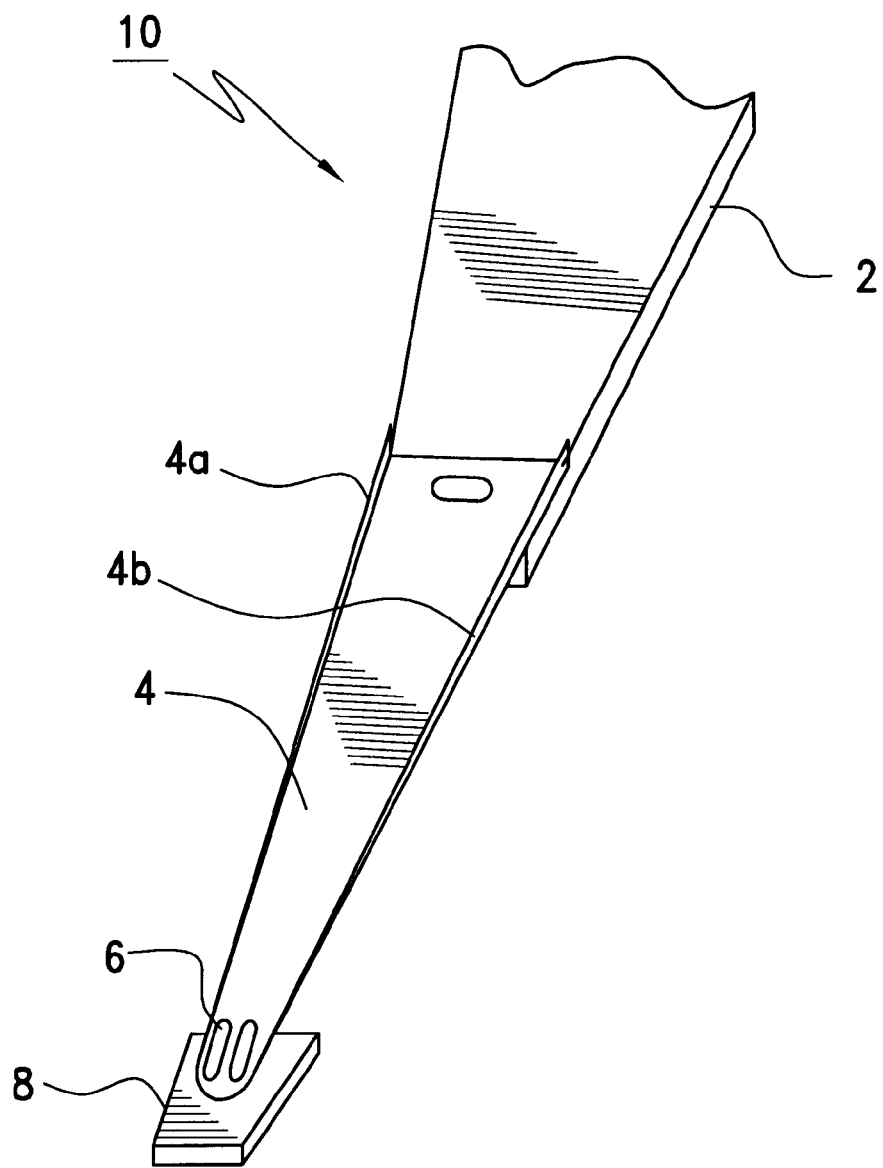
FIG. 1 is an isometric view showing the essential components of a head suspension assembly for a rigid disk drive, according to the prior art.

FIG. 1 is an isometric view showing the essential components of a head suspension assembly 10 for a rigid disk drive according to the prior art. The suspension assembly 10 includes a suspension 4 having side rails 4a, 4b formed by bending the edges of the suspension upward. The suspension 4 is typically tapered along its length. At its wider end, the suspension 4 is connected to an actuator arm 2. The actuator arm 2 has a means at its end (not shown) for connecting it to an actuator assembly (not shown) that causes the suspension assembly 10 to rotate in a plane parallel to the rigid disk and sweep the slider 8 across the surface of the rigid disk.

In operation, the slider 8 floats a small distance (called the "fly height") above the rigid disk on an air bearing created by the rigid disk as it rotates under the suspension assembly 10. The slider 8 is mounted to the narrower end of the suspension 4 by means of a gimbal mount, or flexure, 6. The flexure 6 allows the slider 8 to pitch and roll in response to fluctuations in the air bearing created by geometric variations in the surface of the rotating disk.

Figure 2:
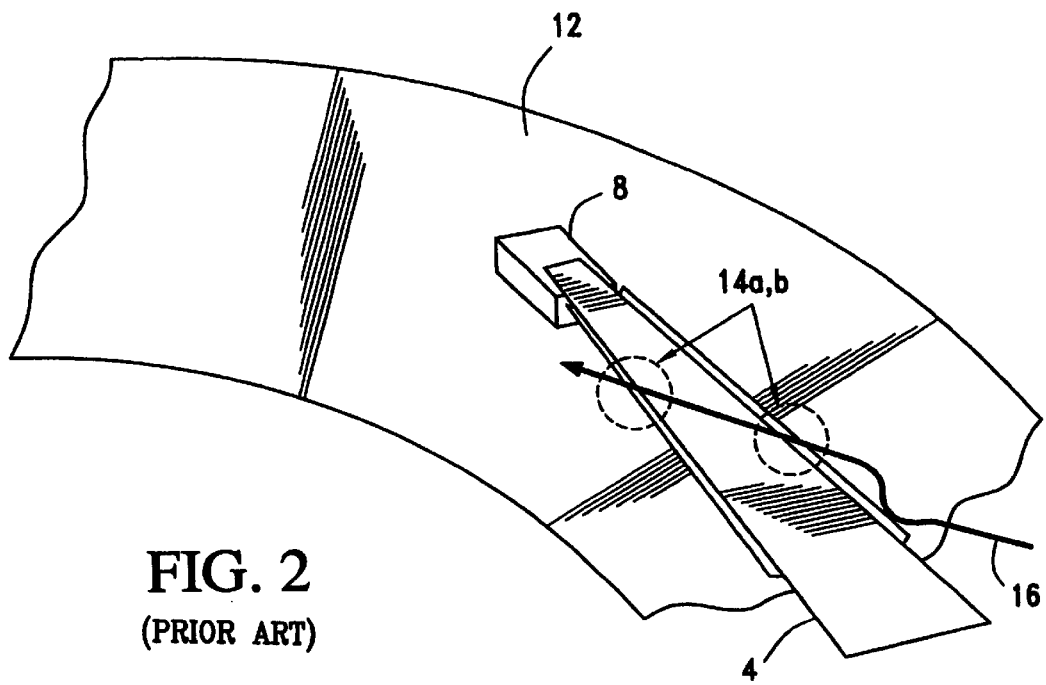
FIG. 2 is a simplified representation of a disk drive in operation with the head suspension assembly of FIG. 1.

FIG. 2 is a simplified representation of the disk drive in operation, with the suspension 4 positioning the slider 8 over the surface of the rotating rigid disk 12. As the disk 12 rotates, the air 16 near its surface is caused to flow over and under the suspension 4, interacting with the leading and trailing edges of the suspension in regions 14a, 14b.

Figure 3:
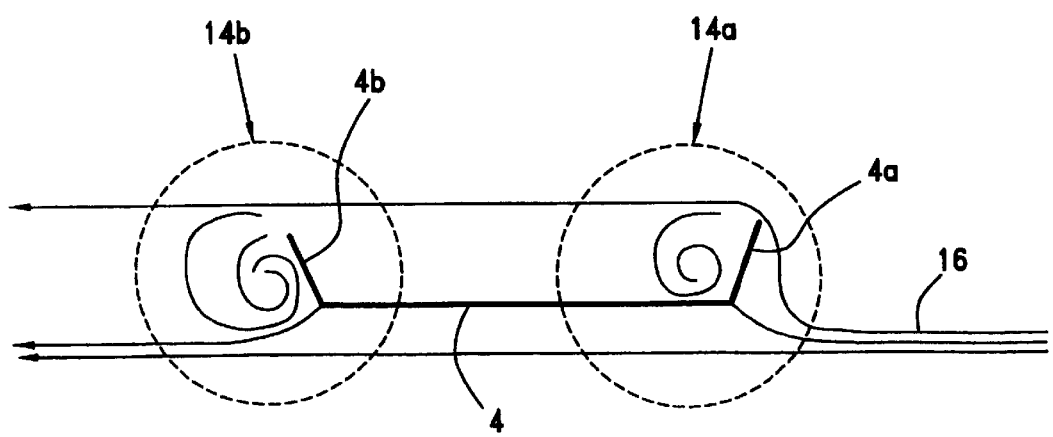
FIG. 3 is a cross-sectional view of the suspension of FIG. 2, including a representation of the airflow over and under the suspension.

FIG. 3 shows the suspension 4 in cross-section and is a more detailed representation of the airflow over and under the suspension. The airflow over and under the suspension interacts with the rails 4a, 4b and creates turbulence on the downstream side of the edge rails in regions 14a, 14b, respectively. The rails have the effect of separating the airflow above and below the suspension, with the results that the airflow becomes non-laminar. The turbulence created by rails 4a, 4b produces unsteady forces that act on the suspension to cause non-repeatable track misregistration with data sectors on the rotating disk. This effect becomes more serious, of course, as disk drives become smaller and spin faster, and data storage densities on the magnetic disks increase.

Figure 4:
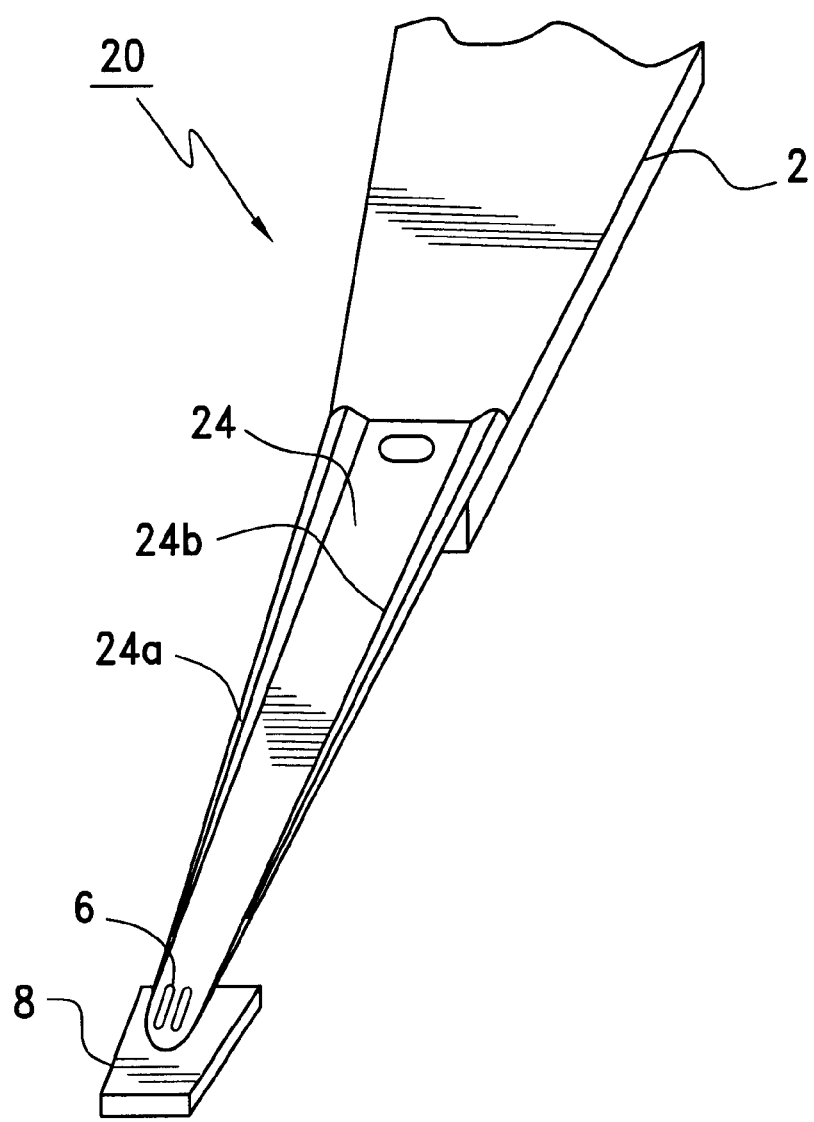
FIG. 4 is an isometric view showing the essential components of a head suspension assembly for a rigid disk drive, according to the present invention.

FIG. 4 is an isometric view showing the essential components of a head suspension assembly 20 for a rigid disk drive according to the present invention. The same reference designations are used in FIG. 4 for elements that are common to both the inventive assembly 20 and the prior art assembly 10. The suspension assembly 20, according to the present invention, includes an actuator arm 2, to which one end of the suspension 24 is joined, a slider 8 containing read/write elements for recording or accessing data on a rigid disk (not shown), and a flexure 6 to which the slider 8 is mounted at the other end of the suspension 24. These elements have been previously described in further detail in connection with the prior art head suspension assembly 10.

Figure 5:
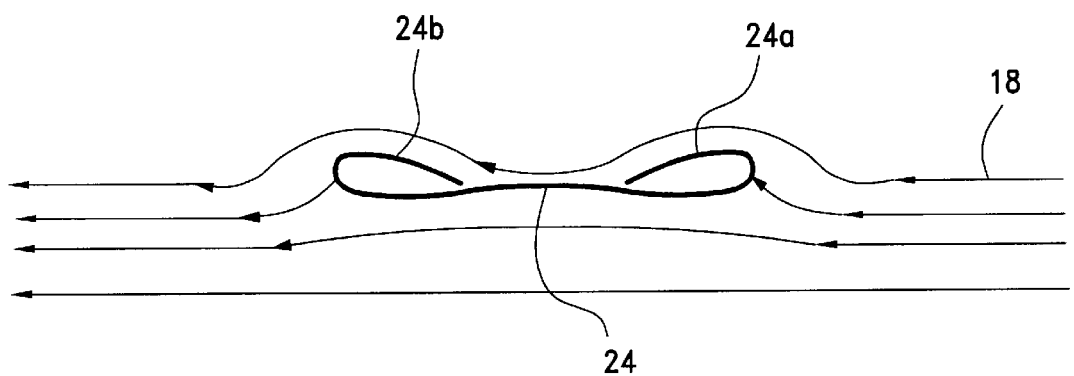
FIG. 5 is a cross-sectional view of the suspension of FIG. 4, including a representation of the airflow over and under the suspension.

The suspension 24 of the embodiment shown in FIG. 4 is similar to prior art suspension 4 in that it has the same general tapered form and is fabricated from a thin springy material such as stainless steel. However, rather than being formed with rails along its longitudinal edges, suspension 24 is formed with stiffeners 24a, 24b along the edges that have an aerodynamic shape. FIG. 5 shows a cross-section of the suspension 24 and illustrates the airflow 18 over and under the suspension when it is in proximity to the rotating rigid magnetic disk 12. In this case, the aerodynamic shape of the stiffeners along the leading and trailing edges 24a, 24b of the suspension 24, assures that the transverse flow of air across the top and bottom surfaces of the suspension will be laminar and significantly reduces or eliminates the turbulence that can produce unsteady forces that act on the suspension to cause flutter.

Figure 6:
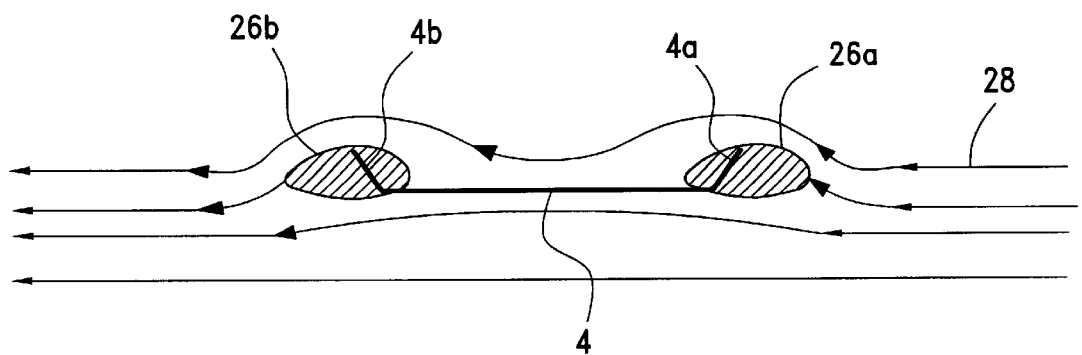
FIG. 6 is a cross-sectional view of a second embodiment of the suspension according to the present invention, including a representation of the airflow over and under the suspension.

The aerodynamic cross-sections at the leading and trailing edges of the suspension 24 are easily fabricated using standard metal forming methods known in the art. The dimensions of the aerodynamic sections are selected such that the overall z-stiffness of the suspension is the same as a standard suspension meeting the requirements of the specific disk drive application for which it is intended. FIG. 6 illustrates an alternative method of providing aerodynamic leading and trailing edges on the suspension. A standard suspension 4 has stiffeners 4a,4b formed at its edges by conventional metal bending techniques. An aerodynamic fairing is formed on each stiffener using an appropriate moldable material. Edges 4a,4b provide the necessary z-stiffness for the suspension 4, while the molded fairings 26a,26b assure laminar airflow 28 over the suspension 4.

The aerodynamic shapes depicted in FIGS. 5 and 6 are for illustration only and not intended to preclude the selection of any suitable shape that can produce laminar airflow without turbulence, across the suspension. The advantage of the present invention is that it results in reduced air turbulence, resulting in a reduction of non-repeatable track misregistration in rigid disk drives and thereby improves disk drive performance. A further advantage is that reduced air drag on the suspension results in lower actuator power due to reduced windage loss.

In general, it should be understood that the invention is not necessarily limited to the specific process, arrangement, materials and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiment of the present invention is susceptible to various modifications, changes and adaptations, and the same are intended to be comprehended within the meaning and range of equivalents of the appended claims.

What is claimed is:

1. A head suspension assembly for a disk drive, comprising:
   an actuator arm;
   a suspension having first and second ends, the first end being connected to the actuator arm, and a rigid region between the first and second ends, the rigid region having top and bottom surfaces and having side edges formed into longitudinal stiffeners having aerodynamic cross-sections;
   a flexure disposed at the second end of the suspension for supporting a slider with a magnetic head; and
   the side edges are formed into longitudinal stiffeners by bending the side edges at an angle and forming aerodynamic fairings of a moldable material over the bent side edges.

2. The head suspension assembly of claim 1, wherein the aerodynamic cross-sections cause transverse airflow across the top and bottom surfaces of the rigid region to be laminar.

3. The head suspension assembly of claim 1, wherein the aerodynamic cross-sections cause transverse airflow across the top and bottom surfaces of the rigid region to be substantially free of turbulence.

4. The head suspension assembly of claim 1, wherein the suspension is manufactured from a generally flat sheet of resilient spring material.

5. The head suspension assembly of claim 4, wherein the resilience spring material is stainless steel.

6. The head suspension assembly of claim 1, wherein the side edges are free of holes.

7. A data storage device, comprising:
   a rotating rigid magnetic storage disk;
   a head suspension assembly including an actuator arm, a suspension having first and second ends, the first end being connected to the actuator arm, and a flexure disposed at the second end of the suspension for supporting a slider with a magnetic head in close proximity to the rotating disk;
   an actuator assembly connected to the actuator arm of the head suspension assembly for positioning the slider over the rotating disk;
   wherein the suspension includes a rigid region between the first and second ends, the rigid region having top and bottom surfaces and having side edges formed into longitudinal stiffeners having aerodynamic cross-sections; and
   the side edges of the suspension are formed into longitudinal stiffeners by bending the side edges at an angle and forming aerodynamic fairings of a moldable material over the bent side edges.

8. The data storage device of claim 7, wherein the aerodynamic cross sections cause transverse airflow across the top and bottom surfaces of the rigid region, generated by the rotating disk, to be laminar.

9. The data storage device of claim 7, wherein the aerodynamic cross sections cause transverse airflow across the top and bottom surfaces of the rigid region, generated by the rotating disk, to be substantially free of turbulence.

10. The data storage device of claim 7, wherein the suspension is manufactured from a generally flat sheet of resilient spring material.

11. The data storage device of claim 10, wherein the resilience spring material is stainless steel.

12. The data storage device of claim 7, wherein the side edges are free of holes.

* * * * *